United States Patent
Park et al.

(10) Patent No.: US 9,088,988 B1
(45) Date of Patent: Jul. 21, 2015

(54) VARIABLE BANDWIDTH OF WIRELESS RELAY NODE BACKHAUL USING BEAMFORMED WIRELESS LINKS

(71) Applicant: Sprint Communications Company L.P., Overland Park, KS (US)

(72) Inventors: Sungki Park, Ashburn, VA (US); Saied Kazeminejad, Ashburn, VA (US)

(73) Assignee: Sprint Communications Company L.P., Overland Park, KS (US)

( * ) Notice: Subject to any disclaimer, the term of this patent is extended or adjusted under 35 U.S.C. 154(b) by 14 days.

(21) Appl. No.: 14/146,137

(22) Filed: Jan. 2, 2014

(51) Int. Cl.
*H04W 16/28* (2009.01)
*H04W 72/04* (2009.01)

(52) U.S. Cl.
CPC ................................ *H04W 72/0486* (2013.01)

(58) Field of Classification Search
CPC ............................. H04W 76/02; H04B 7/0617
USPC .......... 455/450, 7, 73; 370/329, 294; 375/295
See application file for complete search history.

(56) References Cited

U.S. PATENT DOCUMENTS

| | | | |
|---|---|---|---|
| 2010/0304666 | A1 | 12/2010 | Hottinen et al. |
| 2010/0323711 | A1 | 12/2010 | Damnjanovic et al. |
| 2011/0194483 | A1 | 8/2011 | Ji et al. |
| 2012/0263210 | A1 | 10/2012 | Panah et al. |
| 2013/0137444 | A1* | 5/2013 | Ozluturk ........................ 455/450 |
| 2014/0140435 | A1* | 5/2014 | Zhang et al. .................. 375/295 |

FOREIGN PATENT DOCUMENTS

WO 2010086768 8/2010

* cited by examiner

*Primary Examiner* — Phuoc H Doan

(57) ABSTRACT

Systems, methods, and software for providing wireless backhaul to relay nodes associated with a wireless access node are provided herein. In one example, a method of operating a wireless access node is provided. The method includes transmitting a first beamformed backhaul link to a first relay node and a second beamformed backhaul link to a second relay node by at least allocating a first quantity of resource blocks of a carrier frequency to the first beamformed backhaul link and a second quantity of the resource blocks of the carrier frequency to the second beamformed backhaul link. When traffic load information exceeds a load threshold for the first relay node, then the method includes increasing a bandwidth of the first beamformed backhaul link for the first relay node by at least allocating a different amount of the resource blocks to the first beamformed backhaul link.

20 Claims, 6 Drawing Sheets

US 9,088,988 B1

VARIABLE BANDWIDTH OF WIRELESS RELAY NODE BACKHAUL USING BEAMFORMED WIRELESS LINKS

TECHNICAL FIELD

Aspects of the disclosure are related to the field of wireless communications in wireless communication networks.

TECHNICAL BACKGROUND

Wireless communication networks typically include wireless access nodes through which wireless communication devices communicate. Many times, the wireless communication devices are mobile, and move throughout areas of varying wireless coverage. In other examples, the wireless communication devices are located within or near buildings, structures, or terrain which can degrade wireless communications between the wireless communication devices and the wireless access nodes.

Wireless relay nodes can be employed to enhance the wireless coverage of wireless access nodes for wireless communication devices. A wireless relay node relays the wireless communications of a wireless access node for better reception by wireless communication devices which are located far from the wireless access node or in an area of poor wireless coverage. Likewise, a wireless relay node can also relay the wireless communications of the wireless communication devices for better reception by the wireless access node. In contrast to mere repeater nodes which blindly retransmit communications, a relay node can include intelligence and processing features to better handle the communications. These relay nodes can often include backhaul links to communicate with the associated wireless access node. The backhaul links can be wireless or wired backhaul links.

Multiple relay nodes can be employed in a single area of wireless coverage, such as in a sector associated with a wireless access node or to extend the coverage of the sector associated with the wireless access node. However, when many relay nodes are employed in a single wireless coverage area, noise levels or other performance metrics can be degraded due to the multiple transmitters.

OVERVIEW

Systems, methods, and software for providing wireless backhaul to a plurality of relay nodes associated with a wireless access node are provided herein. In one example, a method of operating a wireless access node to provide wireless backhaul to a plurality of relay nodes associated with the wireless access node is provided. The method includes transmitting a first beamformed backhaul link to a first relay node and a second beamformed backhaul link to a second relay node by at least allocating a first quantity of resource blocks of a carrier frequency to the first beamformed backhaul link and a second quantity of the resource blocks of the carrier frequency to the second beamformed backhaul link. The method also includes monitoring traffic load information for the relay nodes while providing the wireless backhaul. When the traffic load information exceeds a load threshold for the first relay node, then the method includes increasing a bandwidth of the first beamformed backhaul link for the first relay node by at least allocating a different amount of the resource blocks to the first beamformed backhaul link.

In another example, a wireless access node configured to provide wireless backhaul to a plurality of relay nodes associated with the wireless access node is provided. The wireless access node includes a transceiver system configured to transmit a first beamformed backhaul link to a first relay node and a second beamformed backhaul link to a second relay node by at least allocating a first quantity of resource blocks of a carrier frequency to the first beamformed backhaul link and a second quantity of the resource blocks of the carrier frequency to the second beamformed backhaul link. The wireless access node also includes a control system configured to monitor traffic load information for the relay nodes while providing the wireless backhaul. When the traffic load information exceeds a load threshold for the first relay node, then the control system is configured to increase a bandwidth of the first beamformed backhaul link for the first relay node by at least allocating a different amount of the resource blocks to the first beamformed backhaul link.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views. While several embodiments are described in connection with these drawings, the disclosure is not limited to the embodiments disclosed herein. On the contrary, the intent is to cover all alternatives, modifications, and equivalents.

DETAILED DESCRIPTION

Figure 1:
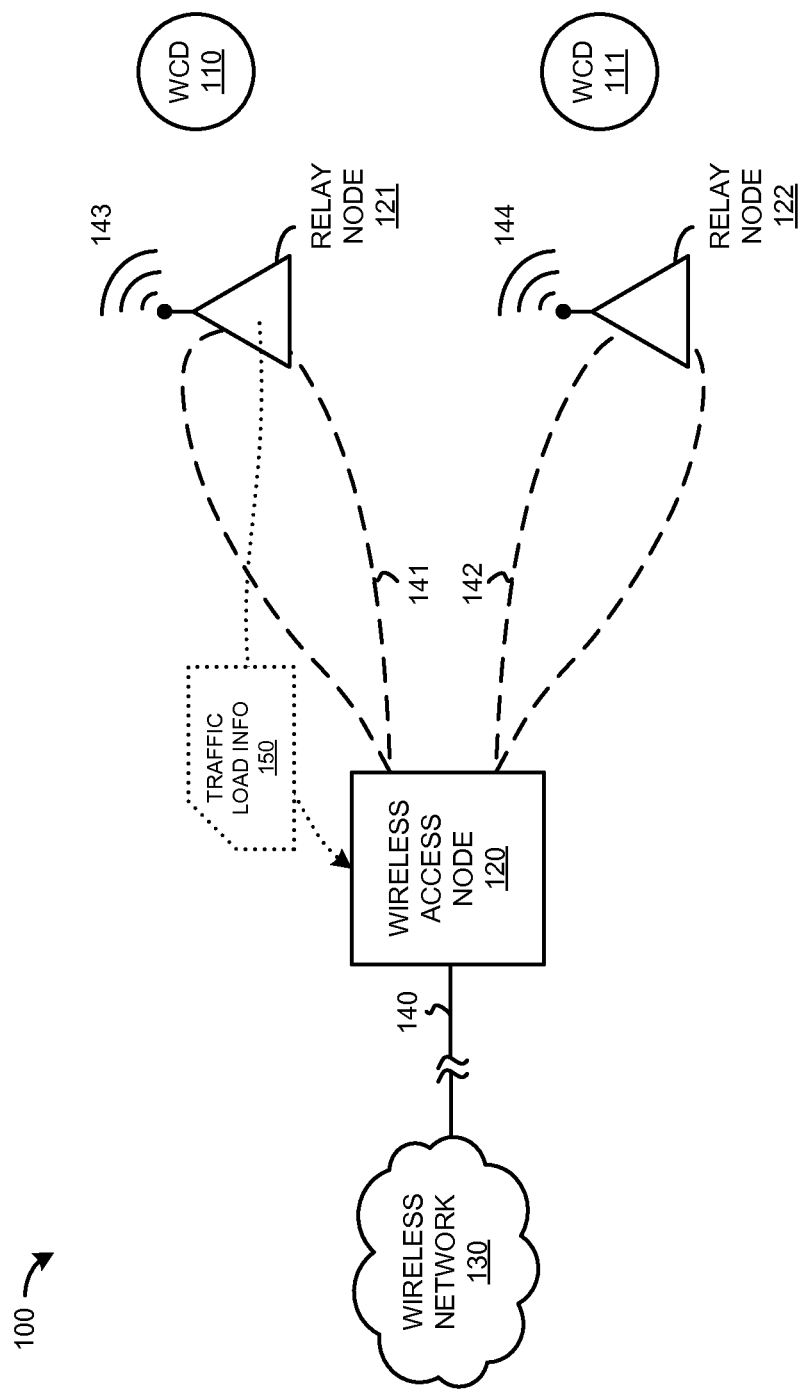
FIG. 1 is a system diagram illustrating a communication system.

FIG. 1 is a system diagram illustrating communication system 100. Communication system 100 includes wireless communication devices (WCD) 110-111, wireless access node 120, wireless relay nodes 121-122, and wireless communication network 130. WCD 110 and relay node 121 communicate over wireless link 143. WCD 111 and relay node 122 communicate over wireless link 144. Wireless access node 120 and relay node 121 communicate over at least wireless link 141. Wireless access node 120 and relay node 122 communicate over at least wireless link 142. Wireless access node 120 and wireless communication network 130 communicate over link 140.

In operation, WCD 110-111 each receive wireless access to communication services through associated one of relay node 121-122. Relay nodes 121-122 are associated with wireless access node 120 and receive backhaul communications over beamformed wireless links 141-142. Further wireless links can be established by wireless access node 120 for communicating with relay nodes 121-122 or providing wireless access to wireless communication devices directly.

Figure 2:
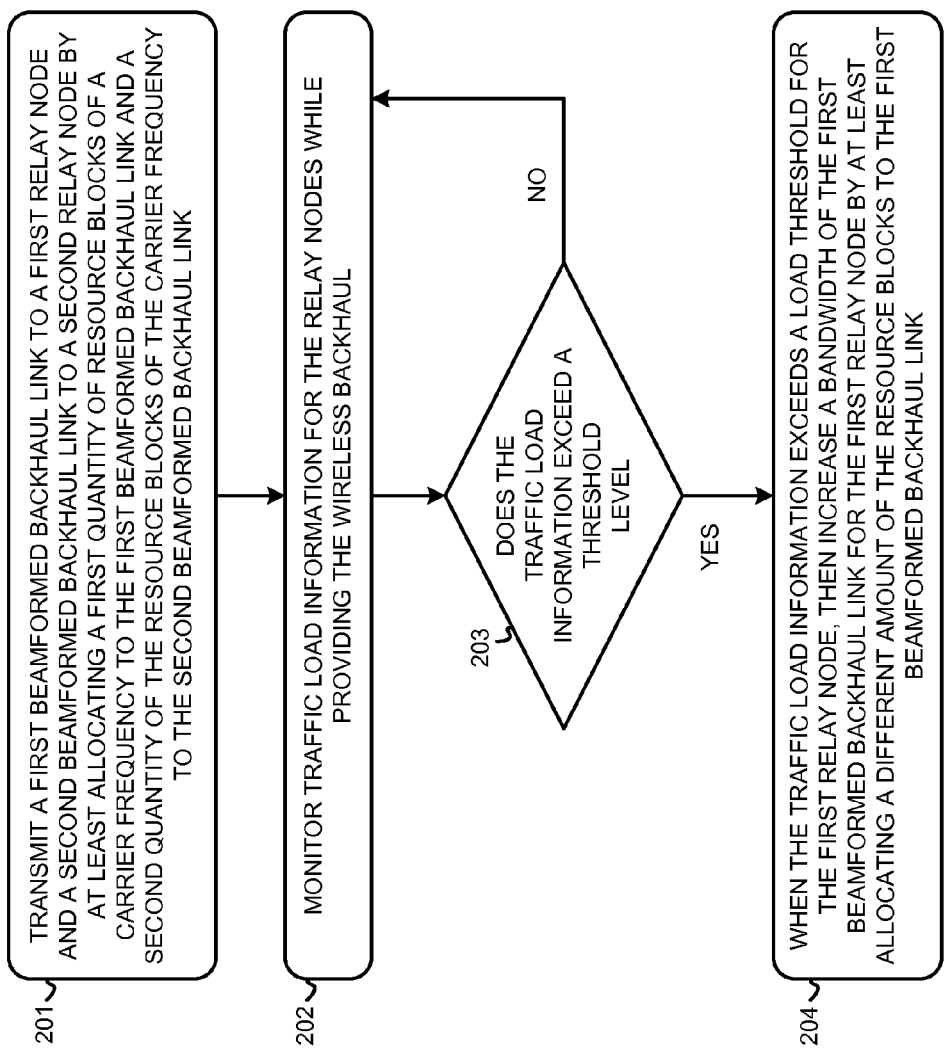
FIG. 2 is a flow diagram illustrating a method of operation of a communication system.

FIG. 2 is presented to further illustrate the operations of FIG. 1. FIG. 2 is a flow diagram illustrating a method of operation of communication system 100. The operations of FIG. 2 are referenced below parenthetically. In FIG. 2, wireless access node 120 transmits (201) first beamformed backhaul link 141 to first relay node 121 and second beamformed backhaul link 142 to second relay node 122 by at least allocating a first quantity of resource blocks of a carrier frequency to first beamformed backhaul link 121 and a second quantity of the resource blocks of the carrier frequency to second beamformed backhaul link 122.

First backhaul link 141 and second backhaul link 142 support associated relay nodes 121-122 for user communications, control communications, and overhead communications. The user communications can be relayed through ones of relay nodes 121-122 to provide wireless links 143-144 for ones of wireless communication devices 110-111. The control and overhead communications can be used by ones of relay nodes 121-122 for controlling the operations of relay nodes 121-122 or relayed over ones of links 143-144 for wireless communication devices 110-111.

In FIG. 1, both first backhaul link 141 and second backhaul link 142 are provided over the same carrier frequency. Since the same carrier frequency is employed for backhaul for both relay node 121 and relay node 122, interference might result. However, in FIG. 1, first backhaul link 141 and second backhaul link 142 are beamformed and the RF energy associated with each beam is confined to a particular angular sub-portion of a sector of wireless coverage of wireless access node 120. Thus, the same carrier frequency can be employed for a backhaul link for different relay nodes since spatial separation ensures crosstalk or interference are below desired levels between beams. In some examples, the beamforming can be achieved by employing a multi-element antenna array in wireless access node 120, using a phased transmission arrangement to direct RF energy in one or more particular directions or angular sub-portions of a sector.

In examples of some communication protocols, an Orthogonal Frequency-Division Multiple Access (OFDMA) scheme is employed for wireless communications, with carrier frequencies subdivided into subcarriers and time-wise subdivisions, with subcarriers and time-wise subdivisions correlating to resource blocks of the wireless link. In examples of Long Term Evolution (LTE) wireless links, these resource blocks are referred to as Physical Resource Blocks (PRB). Other examples of resource blocks can be employed.

Wireless access node 120 allocates a first quantity of resource blocks of a carrier frequency to first beamformed backhaul link 141 and allocates a second quantity of the resource blocks of the carrier frequency to second beamformed backhaul link 142. Thus, for a total quantity of resource blocks associated with the particular carrier frequency, first beamformed backhaul link 141 and second beamformed backhaul link 142 can each share a portion of the total quantity of resource blocks. This portion can be an equal portion or an unequal portion.

Wireless access node 120 monitors (202) traffic load information for relay nodes 121-122 while providing the wireless backhaul. Each of relay nodes 121-122 monitors traffic loading for associated wireless communication device user communications and backhaul traffic. The traffic load information can include a presently used bandwidth of an associated backhaul link, a processor utilization percentage of a relay node, a traffic loading of the associated wireless communication devices, or other loading information for the relay node, backhaul link, or wireless link for wireless communication devices. Responsive to this monitoring, each of relay nodes 121-122 can transfer information about the traffic loading for receipt by wireless access node 120. Wireless access node 120 can monitor this traffic load information for each relay node. In FIG. 1, example traffic load information 150 is shown as transferred by relay node 121 for receipt by wireless access node 120. Relay node 122 can also transfer traffic load information in a similar manner.

When the traffic load information exceeds a load threshold for first relay node 121 (203), then wireless access node 120 increases (204) a bandwidth of first beamformed backhaul link 141 for first relay node 121 by at least allocating a different amount of the resource blocks to first beamformed backhaul link 141. The load threshold can indicate that a backhaul link for the associated relay node is becoming overloaded or exceeding a load threshold, or other loading factors as described above are exceeding a threshold level. Responsive to the load threshold being exceeded, a bandwidth of the associated backhaul link is increased. The increase can be proportional to the amount of traffic load experienced by the associated relay node, or can be incrementally increased according to predetermined increments, among other increases. In this example, a quantity of resource blocks for the carrier frequency allocated for first beamformed backhaul link 141 is increased. In some examples, in addition to increasing the allocation of resource blocks for first beamformed backhaul link 141, a quantity of resource blocks for the carrier frequency allocated to second beamformed backhaul link 142 is decreased accordingly.

In further examples, when the traffic load information exceeds a load threshold for second relay node 122, then wireless access node 120 increases a bandwidth of second beamformed backhaul link 142 for second relay node 122 by at least allocating a different amount of the resource blocks to second beamformed backhaul link 142. Likewise, in addition to increasing the allocation of resource blocks for second beamformed backhaul link 142, a quantity of resource blocks for the carrier frequency allocated to first beamformed backhaul link 141 is decreased accordingly.

The increase in resource block allocation discussed above can include adjusting the allocated resource blocks for a particular beamformed backhaul link. However, in further examples, such as those discussed below for FIGS. 3 and 4, further allocation can occur, such as adjusting a quantity of transmission layers assigned to a particular beamformed backhaul link, or adjusting a time period that a beam is focused on a particular relay node.

Figure 3:
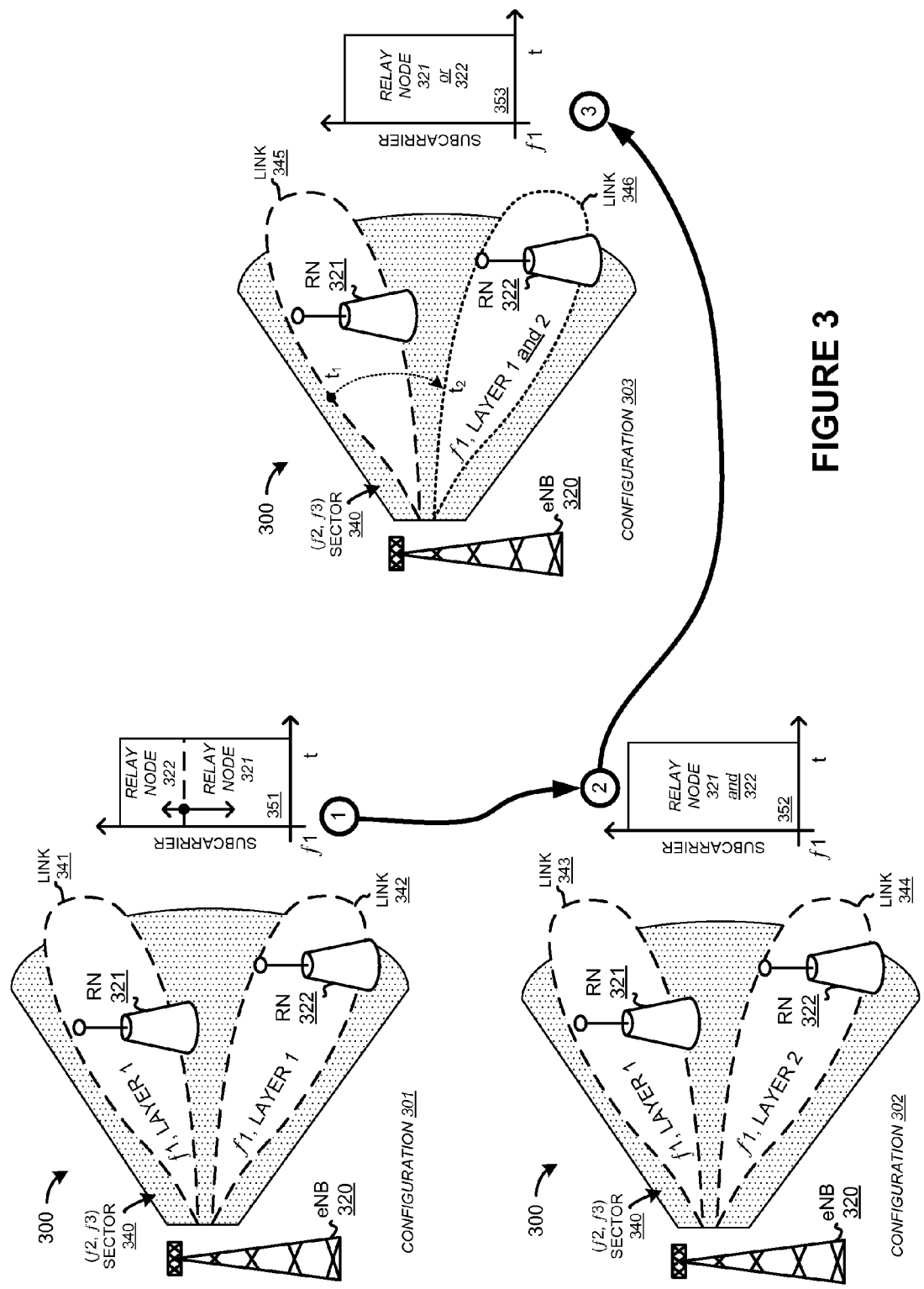
FIG. 3 is a system diagram illustrating a communication system.

FIG. 3 is a system diagram illustrating communication system 300. FIG. 3 includes three configuration examples 301-303 of communication system 300. In each configuration example, communication system 300 includes Evolved UMTS Terrestrial Radio Access Node B (eNB) 320 and relay nodes (RN) 321-322. Although not shown for clarity, communication system 300 can also include wireless communication networks, further eNodeB equipment, wireless communication devices, further relay nodes, and other wireless communication equipment and devices. eNB 320 can communicate with elements of a communication network for exchanging backhaul communications to provide wireless communication services in one or more sectors of wireless coverage.

In operation, eNB 320 provides a plurality of wireless links using an LTE wireless communication protocol. For example, a sector of wireless coverage is provided by sector 340 over at least carrier frequencies f2 and f3, as indicated by the shaded regions in FIG. 3. In this example, sector 340 provided over carrier frequencies f2 and f3 are not beamformed. In contrast, beamformed communications are provided over ones of beamformed wireless links 341-346 using carrier frequency f1 in FIG. 3. Although two separate beams in each configuration example of FIG. 3 are employed, further beamformed wireless links can be employed. In other examples, the wireless links provided over carrier frequencies f2 and f3 are also beamformed for individual user devices.

Figure 4:
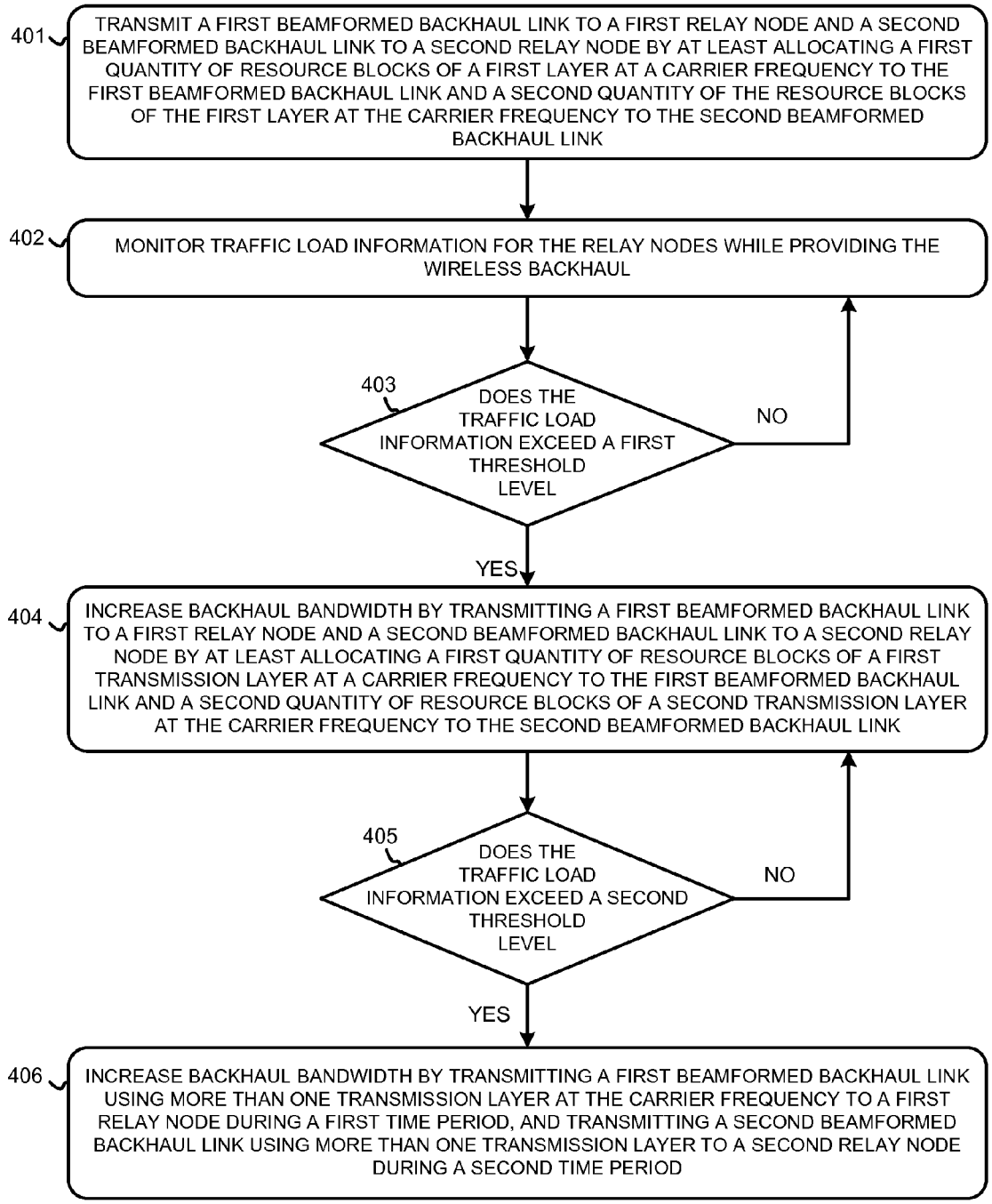
FIG. 4 is a flow diagram illustrating a method of operation of a communication system.

FIG. 4 is presented to further illustrate the operations of FIG. 3. FIG. 4 is a flow diagram illustrating a method of operation of communication system 300. As mentioned above, FIG. 3 has three different configurations 301-303 for communication system 300. Initially, communication system 300 is in configuration 301. Numerical designators '1' through '3' in FIG. 3 also represent an example flow through configurations 301-303.

In configuration 301, eNB 320 transmits (401) a first beamformed backhaul link to a first relay node and a second beamformed backhaul link to a second relay node by at least allocating a first quantity of resource blocks of a first layer at a carrier frequency to the first beamformed backhaul link and a second quantity of the resource blocks of the first layer at the carrier frequency to the second beamformed backhaul link. First backhaul link 341 and second backhaul link 342 support associated relay nodes 321-322 for user communications, control communications, and overhead communications. The user communications can be relayed through ones of relay nodes 321-322 to provide wireless links for user devices (not shown) in FIG. 3. The control and overhead communications can be used by ones of relay nodes 321-322 for controlling the operations of relay nodes 321-322 or relayed over further wireless links for user devices.

In FIG. 3, both first backhaul link 341 and second backhaul link 342 are provided over the same layer 1 of carrier frequency, f1. Since the carrier frequency f1 is employed for both link 341 and link 342, interference might result. However, in FIG. 3, first backhaul link 341 and second backhaul link 342 are beamformed and the RF energy associated with each beam is confined to a particular angular sub-portion of sector 340 of wireless coverage of eNB 320. Thus, the same carrier frequency can be employed for a backhaul link for different relay nodes since spatial separation ensures crosstalk or interference are below desired levels between beams.

Also, a single transmission layer 1 of carrier frequency f1 is employed in configuration 301. In a single transmission layer mode, antenna elements of an antenna array associated with sector 340 are used to provide separate beamformed transmissions to one or more relay nodes. However, the resource blocks of the carrier frequency f1 are shared between all relay nodes in the single transmission layer example. Thus, although two separate beams are employed, one for each of links 341-342, these links share resource blocks of the single transmission layer of the carrier frequency and thus the resource blocks must be allocated amongst links 341-342.

In examples of LTE communication protocols, an OFDMA scheme is employed for wireless communications, with carrier frequencies subdivided into subcarriers and time-wise subdivisions, each subcarrier and time-wise subdivision correlating to a resource block of the wireless link. In examples of these LTE wireless links, the resource blocks are referred to as Physical Resource Blocks (PRB). A representation of PRBs for a particular carrier frequency is shown in FIG. 3 in allocation diagram 351. Allocation diagram 351 has a horizontal axis that represents time-wise subdivisions of the carrier frequency and a vertical axis that represents subcarrier subdivisions of the carrier frequency. A number of PRBs comprise allocation diagram 351.

In configuration 301, eNB 320 allocates a first quantity of PRBs of the single layer 1 of carrier frequency f1 to first beamformed backhaul link 341 and allocates a second quantity of PRBs of the same layer 1 of carrier frequency f1 to second beamformed backhaul link 342. Thus, for a total quantity of PRBs shown in graph 351 for layer 1 of carrier frequency f1, first beamformed backhaul link 341 and second beamformed backhaul link 342 can each share a portion of the total quantity of PRBs. This portion can be an equal portion, or an unequal portion.

As shown in configuration 301 in FIG. 3 this PRB allocation can be flexible and scale according to traffic loading on each of relay nodes 321-322. For example, when the traffic load information increases for relay node 321, then eNOB 320 can increase a bandwidth of first beamformed backhaul link 341 for first relay node 321 by at least allocating a different amount of PRBs first beamformed backhaul link 341. The increase can be proportional to the amount of traffic load experienced by the associated relay node, or can be incrementally increased according to predetermined increments, among other increases. Since in FIG. 3 there are only two relay nodes, then in addition to increasing the allocation of PRBs for first beamformed backhaul link 341, a quantity of PRBs for the carrier frequency allocated to second beamformed backhaul link 342 is decreased accordingly. If further relay nodes are employed, then associated adjustments in the PRB allocation can occur. Also, in some examples, all PRBs might not be allocated to a particular relay node, and a portion of the total PRBs instead can be used to service user devices or other communications.

In further examples, when the traffic load information increases for second relay node 322, then eNB 320 can increase a bandwidth of second beamformed backhaul link 342 for second relay node 322 by at least allocating a different amount of PRBs to second beamformed backhaul link 342. Likewise, in addition to increasing the allocation of resource blocks for second beamformed backhaul link 342, a quantity of resource blocks for the carrier frequency allocated to first beamformed backhaul link 341 are decreased accordingly.

However, the amount of PRBs for carrier frequency f1 using a single layer 1 and as divided between two relay nodes can exceed a usage or allocation threshold due to further traffic loading of the relay nodes. In such examples, further configurations 302-303 in FIG. 3 are shown.

eNB 320 monitors (402) traffic load information for the relay nodes while providing the wireless backhaul. Each of relay nodes 321-322 monitors traffic loading for associated user devices that rely upon the relay node for user communications and backhaul traffic. The traffic load information can include a presently used bandwidth of an associated backhaul link, a processor utilization percentage of a relay node, a traffic loading of the associated wireless communication devices, or other loading information for the relay node, backhaul link, or wireless link for user devices. Responsive to this monitoring, each of relay nodes 321-322 can transfer information about the traffic loading for receipt by eNB 320. eNB 320 can monitor this traffic load information for each relay node. In some examples, this traffic loading information is transferred over physical downlink control channel (PDCCH) messaging or physical downlink shared channel (PDSCH) messaging from relay nodes to eNB 320.

If the traffic load information does not exceed a first threshold level (403), then communication system 300 remains in configuration 301. In configuration 301, the PRBs for layer 1 for carrier frequency f1 are shared and allocated among links 341-342.

If the traffic load information exceeds a first threshold level (403), then communication system 300 enters configuration 302. In configuration 302, eNB 320 increases (404) backhaul bandwidth by transmitting first beamformed backhaul link 343 to first relay node 321 and second beamformed backhaul link 344 to second relay node 322 by at least allocating a first quantity of resource blocks of a first transmission layer at a carrier frequency to first beamformed backhaul link 343 and a second quantity of resource blocks of a second transmission layer at the carrier frequency to second beamformed backhaul link 344.

Instead of a single layer 1 of carrier frequency f1 as used in configuration 301, configuration 302 employs two transmission layers, namely layer 1 and layer 2 for carrier frequency f1. In a two layer mode, antenna elements of an antenna array associated with sector 340 are used to provide separate layers for beamformed transmissions to one or more relay nodes. In two layer examples, a first portion of the antenna elements can be dedicated to a first transmission layer and another, different portion of the antenna elements can be dedicated to a second layer. However, the PRBs of the first layer of the carrier frequency f1 are not shared with the PRBs of the second layer of the carrier frequency. Thus, each of links 343-344 can have independent and dedicated PRBs in an amount up to the total PRBs for the entire layer of the carrier frequency. In this manner, the entire amount of PRBs of a particular carrier frequency can be simultaneously used twice, once for the first layer, and again for the second layer.

A representation of PRBs for a particular carrier frequency is shown in FIG. 3 in allocation diagram 352. Allocation diagram 352 has a horizontal axis that represents time-wise subdivisions of the carrier frequency and a vertical axis that represents subcarrier subdivisions of the carrier frequency. A number of PRBs can comprise allocation diagram 352. In configuration 302, eNB 320 allocates all of the PRBs of the first layer 1 of carrier frequency f1 to first beamformed backhaul link 343 and allocates all of the PRBs of the second layer 1 of carrier frequency f1 to second beamformed backhaul link 344. Thus, for a total quantity of PRBs shown in graph 352 for each layer of carrier frequency f1, first beamformed backhaul link 341 and second beamformed backhaul link 342 can each use all of the total quantity of PRBs for each layer. It should be understood that a lesser amount that all PRBs for an entire layer can be used. Although two layers are discussed in configuration 302, it should be understood that more than two layers can be employed, and the PRBs of each layer allocated accordingly to individual beamformed links.

If the traffic load information does not exceed a second threshold level (405), then communication system 300 remains in configuration 302. In configuration 302, the PRBs for layer 1 for carrier frequency f1 are used for link 343, and the PRBs for layer 2 for carrier frequency f1 are used for link 344.

If the traffic load information exceeds a second threshold level (405), then communication system 300 enters configuration 303. In configuration 303, eNB 320 increases (406) backhaul bandwidth by transmitting first beamformed backhaul link 345 using more than one transmission layer at the carrier frequency f1 to first relay node 321 during a first time period, and transmitting second beamformed backhaul link 346 using more than one transmission layer at the carrier frequency f1 to second relay node 322 during a second time period.

Two layers are employed in configuration 303 in a similar manner as done in configuration 302 above. However, instead of dedicating a single layer to each of links 343-344 as done in configuration 302, eNB 320 dedicates at least two layers to each of links 345-346 in configuration 303. Thus, each of links 345-346 can have independent and dedicated PRBs in an amount up to the total PRBs for two or more layers of the carrier frequency f1. In this manner, the entire PRBs of a particular carrier frequency can be used twice, once for the first layer, and again for the second layer. However, each relay node only uses a particular layer for a particular period of time before that layer is changed to the other relay node. Specifically, each of links 345-346 are formed temporarily for a period of time, where the PRBs for both layer 1 and layer 2 are dedicated to a particular link for periods of time. After the particular period of time, then the layer or layers dedicated to a particular link are changed to the other link.

In a first example, both layer 1 and layer 2 for the carrier frequency f1 are directed to link 345 for relay node 321 during time period t1. During time t2, both layer 1 and layer 2 for the carrier frequency f1 are directed to link 346 for relay node 322. In an alternate example, during t1, layer 1 for carrier frequency f1 is dedicated to link 345 for relay node 321 and layer 2 for carrier frequency f1 is dedicated to link 346 for relay node 322. In this alternate example, during time t2, layer 2 for carrier frequency f1 is dedicated to link 345 for relay node 321 and layer 1 for carrier frequency f1 is dedicated to link 346 for relay node 322. In both examples, a particular wireless link or relay node receives temporary usage of the up to all of PRBs for both layers for the carrier frequency. Although two layers are discussed in configuration 303, it should be understood that more than two layers can be employed, and the PRBs of each layer allocated during a particular time period accordingly.

A representation of PRBs for carrier frequency f1 is shown in FIG. 3 in allocation diagram 353. Allocation diagram 353 has a horizontal axis that represents time-wise subdivisions of the carrier frequency and a vertical axis that represents subcarrier subdivisions of the carrier frequency. A number of PRBs can comprise allocation diagram 353. In configuration 303, eNB 320 allocates all of the PRBs of the first layer 1 and the second layer 2 of carrier frequency f1 to each beamformed backhaul link 345-346 according to one or more time periods. Thus, for a total quantity of PRBs shown in graph 353 for each layer of carrier frequency f1, first beamformed backhaul link 345 and second beamformed backhaul link 346 can each use all of the total quantity of PRBs for both layers, but during different time periods. It should be understood that a lesser amount that all PRBs for an entire layer can be used.

Figure 5:
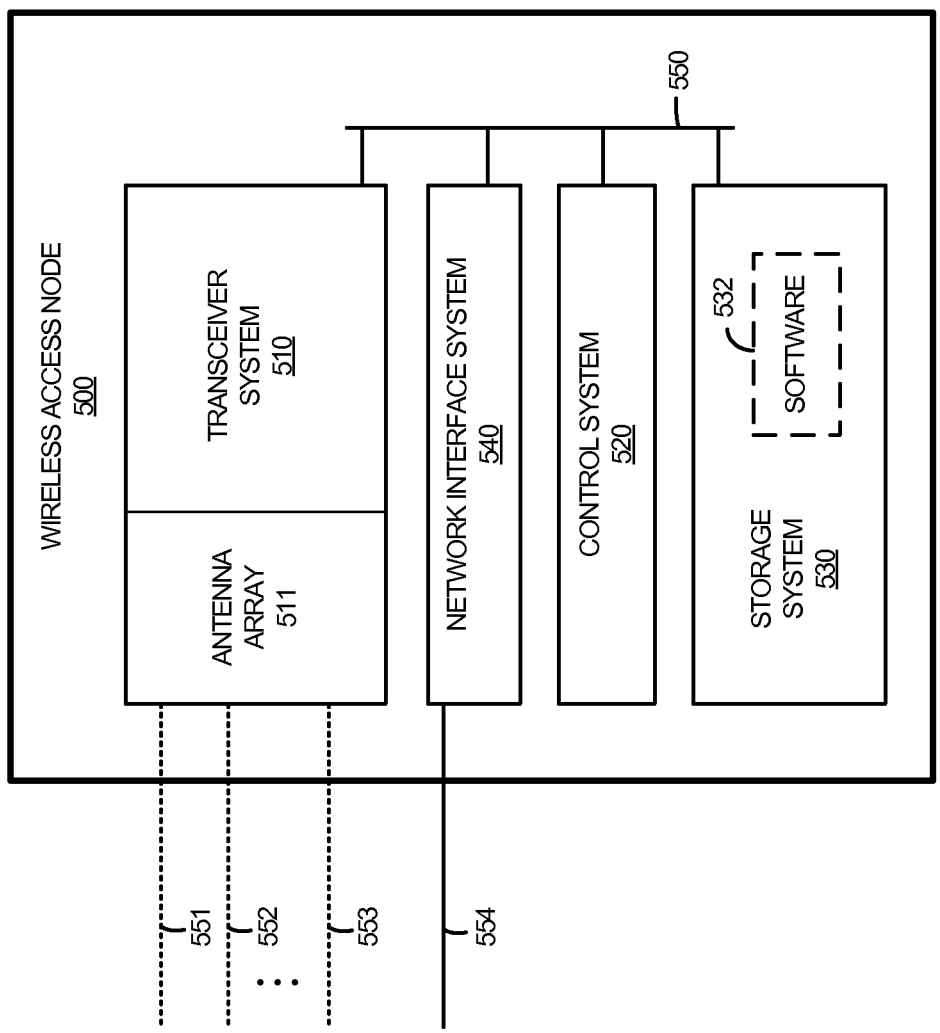
FIG. 5 is a block diagram illustrating a wireless access node.

FIG. 5 is a block diagram illustrating a detailed view of wireless access node 500. Wireless access node 500 can include equipment and systems as discussed herein for wireless access node 120 in FIG. 1 or eNB 320 of FIG. 3, although variations are possible. Wireless access node 500 includes transceiver system 510, antenna array 511, network interface system 514, control system 520, and storage system 530. In operation, control system 520 is operatively linked to transceiver system 510, network interface system 514, and storage system 530 by bus 550. It should be understood that discrete links can be employed, such as network links or other circuitry. Wireless access node 500 can be distributed or consolidated among equipment or circuitry that together forms the elements of wireless access node 500. Wireless access node 500 can optionally include additional devices, features, or functionality not discussed here for purposes of brevity.

Transceiver system 510 comprises one or more communication interfaces for communicating with wireless communication devices and relay nodes over antenna array 511 and wireless links 551-553. Although three wireless links 551-553 are included in FIG. 5, a different quantity can instead be employed. Transceiver system 510 also receives command and control information and instructions from control system 520 or network interface system 514 for controlling the operations of relay nodes and user devices over wireless links 551-553, coordinating handoffs of user devices between other wireless access nodes, exchanging authentication or authorization information with other wireless communication network equipment, providing parameters to user devices, and transferring communications for delivery to user devices. Wireless links 551-553 can use various protocols or communication formats as described herein for wireless links 141-142 in FIG. 1, including combinations, variations, or improvements thereof.

Antenna array 511 includes 511-513 each can comprise one or more antenna elements, RF coupling equipment, structural supports, cabling, or other equipment. In some examples, elements of antenna array 511 can comprise a directed antenna array, such as a yagi antenna, dish antenna, parabolic antenna, or phased antenna array to establish beam forming during transmissions to user devices. In some examples, antenna array 511 includes up to eight antenna elements, making four columns that each include two overlaid orthogonal antenna elements grouped together. Each antenna element can be driven independently via an associated antenna port. Each element of a pair or column can be cross-polarized with the second element of the pair or column in an overlapping 'zig-zag' pattern.

Network interface system 514 includes a network interface for communicating with one or more communication networks over backhaul links, such as a wireless communication system, among others. The network interface can include a T1 interface, or local or wide area network communication interfaces which can communicate over one or more Ethernet or Internet protocol (IP) links. Examples of network interface system 514 include network interface card equipment, transceivers, modems, and other communication circuitry. In this example, network interface system 514 communicates over link 554. Link 554 can include one or more communication links as described herein, such as that described for link 140 in FIG. 1.

Control system 520 includes a processing system which can comprise one or more microprocessors and other circuitry that retrieves and executes software 532 from storage system 530. Control system 520 can be implemented within a single processing device but can also be distributed across multiple processing devices or sub-systems that cooperate in executing program instructions. Examples of control system 520 include general purpose central processing units, application specific processors, and logic devices, as well as any other type of processing device, combinations, or variations thereof.

Storage system 530 can comprise any computer readable storage media readable by control system 520 and capable of storing software 532. Storage system 530 can include volatile and nonvolatile, removable and non-removable media implemented in any method or technology for storage of information, such as computer readable instructions, data structures, program modules, or other data.

In addition to storage media, in some implementations storage system 530 can also include communication media over which software 532 can be communicated. Storage system 530 can be implemented as a single storage device but can also be implemented across multiple storage devices or sub-systems co-located or distributed relative to each other. Storage system 530 can comprise additional elements, such as a controller, capable of communicating with control system 520. Examples of storage media include random access memory, read only memory, magnetic disks, optical disks, flash memory, virtual memory and non-virtual memory, magnetic cassettes, magnetic tape, magnetic disk storage or other magnetic storage devices, or any other medium which can be used to store the desired information and that can be accessed by an instruction execution system, as well as any combination or variation thereof, or any other type of storage media. In no case is the storage media a propagated signal.

Software 532 can be implemented in program instructions and among other functions can, when executed by wireless access node 500 in general or control system 520 in particular, direct wireless access node 500 or control system 520 to transmit beamformed backhaul links for relay nodes, modify resource block allocation for beamformed backhaul links, monitor traffic loading information for relay nodes, and exchange communications with user devices through relay nodes, among other operations. Software 532 can include additional processes, programs, or components, such as operating system software, database software, or application software. Software 532 can also comprise firmware or some other form of machine-readable processing instructions executable by control system 520. In at least one implementation, the program instructions can include first program instructions that direct control system 520 to transmit beamformed backhaul links for relay nodes, modify resource block allocation for beamformed backhaul links, monitor traffic loading information for relay nodes, and exchange communications with user devices through relay nodes, among other operations.

In general, software 532 can, when loaded into control system 520 and executed, transform control system 520 overall from a general-purpose computing system into a special-purpose computing system customized to transmit beamformed backhaul links for relay nodes, modify resource block allocation for beamformed backhaul links, monitor traffic loading information for relay nodes, and exchange communications with user devices through relay nodes, among other operations. Encoding software 532 on storage system 530 can transform the physical structure of storage system 530. The specific transformation of the physical structure can depend on various factors in different implementations of this description. Examples of such factors can include, but are not limited to the technology used to implement the storage media of storage system 530 and whether the computer-storage media are characterized as primary or secondary storage. For example, if the computer-storage media are implemented as semiconductor-based memory, software 532 can transform the physical state of the semiconductor memory when the program is encoded therein. For example, software 532 can transform the state of transistors, capacitors, or other discrete circuit elements constituting the semiconductor memory. A similar transformation can occur with respect to magnetic or optical media. Other transformations of physical media are possible without departing from the scope of the present description, with the foregoing examples provided only to facilitate this discussion.

Figure 6:
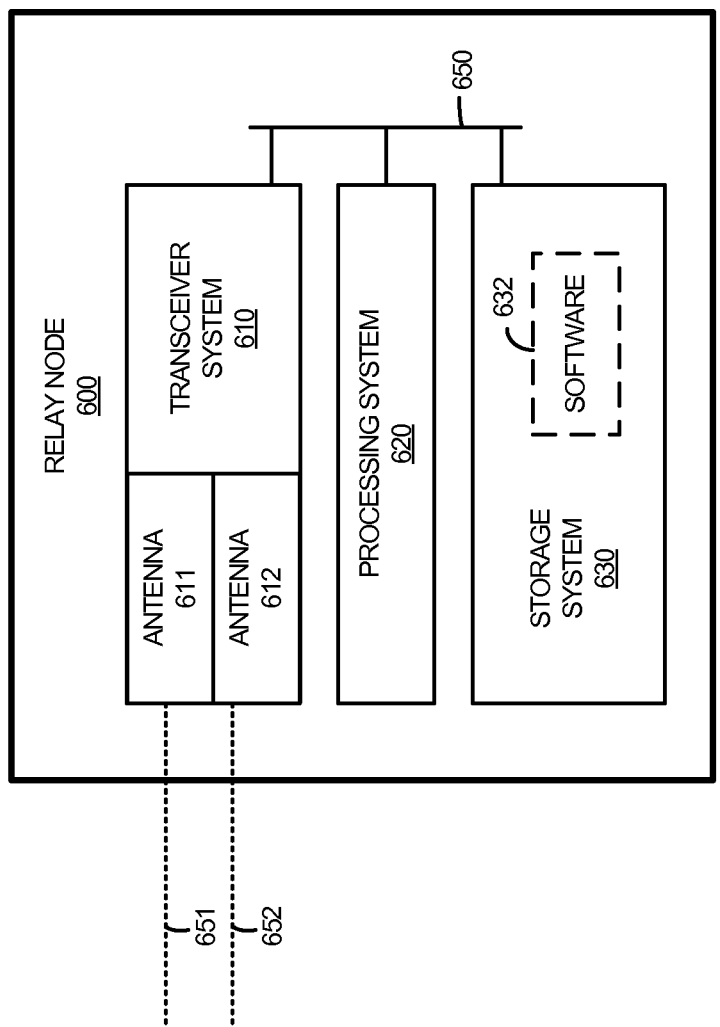
FIG. 6 is a block diagram illustrating a relay node.

FIG. 6 is a block diagram illustrating a detailed view of relay node 600. Relay node 600 can include equipment and systems as discussed herein for relay nodes 121-122 in FIG. 1 or relay nodes 321-322 in FIG. 3, although variations are possible. Relay node 600 includes transceiver system 610, antennas 611-612, processing system 620, and storage system 630. In operation, processing system 620 is operatively linked to transceiver system 610 and storage system 630 by bus 650. It should be understood that discrete links can be employed, such as network links or other circuitry. Relay node 600 can be distributed or consolidated among equipment or circuitry that together forms the elements of relay node 600. Relay node 600 can optionally include additional devices, features, or functionality not discussed here for purposes of brevity.

Transceiver system 610 comprises one or more communication interfaces for communicating with wireless communication devices and wireless access nodes. Transceiver system 610 can include transceiver equipment for wirelessly exchanging user communications and overhead communications with user devices and associated wireless access nodes, omitted for clarity, using antenna arrays 611-612 and the associated wireless links 651-652. Transceiver system 610 also receives command and control information and instructions from processing system 620. Wireless links 651-652 can use various protocols or communication formats as described herein for wireless links 141-144 in FIG. 1 or wireless links 340-346 in FIG. 3, including combinations, variations, or improvements thereof.

Antennas 611-612 each comprise one or more antenna elements, RF coupling equipment, structural supports, cabling, or other equipment. In some examples, elements of antennas 611-612 can comprise a directed antenna array, such as a yagi antenna, dish antenna, parabolic antenna, or phased antenna array to establish or receive beam forming transmissions.

Processing system 620 can comprise one or more microprocessors and other circuitry that retrieves and executes software 632 from storage system 630. Processing system 620 can be implemented within a single processing device but can also be distributed across multiple processing devices or sub-systems that cooperate in executing program instructions. Examples of processing system 620 include general purpose central processing units, application specific processors, and logic devices, as well as any other type of processing device, combinations, or variations thereof.

Storage system 630 can comprise any computer readable storage media readable by processing system 620 and capable of storing software 632. Storage system 630 can include volatile and nonvolatile, removable and non-removable media implemented in any method or technology for storage of information, such as computer readable instructions, data structures, program modules, or other data.

In addition to storage media, in some implementations storage system 630 can also include communication media over which software 632 can be communicated. Storage system 630 can be implemented as a single storage device but can also be implemented across multiple storage devices or subsystems co-located or distributed relative to each other. Storage system 630 can comprise additional elements, such as a controller, capable of communicating with processing system 620. Examples of storage media include random access memory, read only memory, magnetic disks, optical disks, flash memory, virtual memory and non-virtual memory, magnetic cassettes, magnetic tape, magnetic disk storage or other magnetic storage devices, or any other medium which can be used to store the desired information and that can be accessed by an instruction execution system, as well as any combination or variation thereof, or any other type of storage media. In no case is the storage media a propagated signal.

Software 632 can be implemented in program instructions and among other functions can, when executed by relay node 600 in general or processing system 620 in particular, direct relay node 600 or processing system 620 to exchange communications with wireless communication devices, receive backhaul communications over wireless links, monitor traffic loading, and transfer traffic loading information to associated wireless access nodes, among other operations. The modulation codes can be stored in software 632 or storage system 630 and can be programmed by a user of relay node 600 or received over any of wireless links 651-652. Software 632 can include additional processes, programs, or components, such as operating system software, database software, or application software. Software 632 can also comprise firmware or some other form of machine-readable processing instructions executable by processing system 620. In at least one implementation, the program instructions can include first program instructions that direct processing system 620 to exchange communications with wireless communication devices, receive backhaul communications over wireless links, monitor traffic loading, and transfer traffic loading information to associated wireless access nodes, among other operations.

In general, software 632 can, when loaded into processing system 620 and executed, transform processing system 620 overall from a general-purpose computing system into a special-purpose computing system customized to exchange communications with wireless communication devices, receive backhaul communications over wireless links, monitor traffic loading, and transfer traffic loading information to associated wireless access nodes, among other operations. Encoding software 632 on storage system 630 can transform the physical structure of storage system 630. The specific transformation of the physical structure can depend on various factors in different implementations of this description. Examples of such factors can include, but are not limited to the technology used to implement the storage media of storage system 630 and whether the computer-storage media are characterized as primary or secondary storage. For example, if the computer-storage media are implemented as semiconductor-based memory, software 632 can transform the physical state of the semiconductor memory when the program is encoded therein. For example, software 632 can transform the state of transistors, capacitors, or other discrete circuit elements constituting the semiconductor memory. A similar transformation can occur with respect to magnetic or optical media. Other transformations of physical media are possible without departing from the scope of the present description, with the foregoing examples provided only to facilitate this discussion.

Referring back to FIG. 1, wireless communication devices (WCD) 110-111 each comprise transceiver circuitry and communication elements. The transceiver circuitry typically includes amplifiers, filters, modulators, and signal processing circuitry. WCD 110-111 may also each include user interface systems, memory devices, non-transitory computer-readable storage mediums, software, processing circuitry, or some other communication components. WCD 110-111 may each be a user device, wireless communication device, subscriber equipment, customer equipment, access terminal, smartphone, telephone, mobile wireless telephone, personal digital assistant (PDA), computer, e-book, mobile Internet appliance, wireless network interface card, media player, game console, or some other wireless communication apparatus, including combinations thereof. Although two user devices are shown in FIG. 1, it should be understood that a different number of devices can be included. WCD 110-111 can each include multiple transceiver portions or antenna portions, among other circuit and equipment elements, for communicating wirelessly with multiple wireless communication networks, using different wireless communication modes or wireless communication protocols.

Wireless access node 120 is associated with a wireless communication network, and provides wireless links for wireless access to the communication services of the wireless communication network. Wireless access node 120 comprises RF communication and control circuitry, transceivers, and antennas, as well as wireless communications equipment capable of communicating with and providing wireless access to communication services within at least one wireless coverage area for wireless communication devices. Wireless access node 120 also includes circuitry and equipment to monitor and control the operations of relay nodes, such as relay nodes 121-122. Wireless access node 120 includes one or more antenna elements to create beamformed transmissions for relay nodes or wireless communication devices. Wireless access node 120 includes RF communication circuitry such as antennas, amplifiers, filters, RF modulators, transceivers, or signal processing circuitry to provide a sector of wireless coverage. Wireless access node 120 can include signal processing circuitry, routers, backhaul interfaces, and other communication handling equipment. Wireless access node 120 can also comprise elements such as base stations, base transceiver stations, E-UTRAN Node B equipment, eNodeB equipment, Evolved Node B equipment, Evolved Universal Terrestrial Radio Access (E-UTRA) network equipment.

Relay nodes 121-122 each comprise RF communication and control circuitry, transceivers, and antennas, as well as wireless communications equipment which relay wireless communications received from a wireless access node. Relay nodes 121-122 each include antennas, amplifiers, control interfaces, buffers, transmitters, receivers, monitoring systems, processing systems, or other communication equipment and circuitry. Relay nodes 121-122 each can include multiple antennas for receiving backhaul communications and relaying communications to user devices.

Wireless network 130 comprises communication and control systems for providing access to communication services for other devices and networks. Wireless network 130 can provide communication services including communication routing, link bridging, network communications, data exchange, or other communication services. In some examples, wireless network 130 is a cellular voice and data network that can provide voice calls, text messages, data access, or other communication services provided over cellular or wireless communication networks. In some examples, wireless network 130 includes equipment to provide wireless access to communication services within different coverage areas to user devices, route communications between content providers and user devices, and facilitate handoffs between equipment of different coverage areas, among other operations. Wireless network 130 can also comprise elements such as radio access network (RAN) equipment, E-UTRAN Node B equipment, eNodeB equipment, Evolved Node B equipment, Mobility Management Entity (MME) equipment, interworking functions (IWF), Home Subscriber Servers (HSS), Evolved Universal Terrestrial Radio Access (E-UTRA) network equipment, base stations, base transceiver stations (BTS), base station controllers (BSC), mobile switching centers (MSC), home location registers (HLR), radio node controllers (RNC), call processing systems, authentication, authorization and accounting (AAA) equipment, access service network gateways (ASN-GW), packet data switching nodes (PDSN), home agents (HA), mobility access gateways (MAG), Internet access nodes, telephony service nodes, databases, or other communication and control equipment.

Communication link 140 uses metal, glass, optical, air, space, or some other material as the transport media. Communication link 140 can use various communication protocols, such as Time Division Multiplex (TDM), asynchronous transfer mode (ATM), Internet Protocol (IP), Ethernet, synchronous optical networking (SONET), hybrid fiber-coax (HFC), Universal Serial Bus (USB), circuit-switched, communication signaling, wireless communications, or some other communication format, including combinations, improvements, or variations thereof. Communication link 140 can be a direct link or can include intermediate networks, systems, or devices, and can include a logical network link transported over multiple physical links.

Wireless links 141-144 use the air or space as the transport media. Wireless links 141-144 each comprise one or more wireless communication links provided over an associated wireless frequency spectrum or wireless frequency band, and can use various protocols. In this example, wireless links 141-144 can each comprise Long Term Evolution (LTE), LTE Advanced, Code Division Multiple Access (CDMA), Evolution-Data Optimized (EVDO), single-carrier radio transmission technology link (1xRTT), Global System for Mobile Communication (GSM), Universal Mobile Telecommunications System (UMTS), High Speed Packet Access (HSPA), Radio Link Protocol (RLP), 3rd Generation Partnership Project (3GPP) Worldwide Interoperability for Microwave Access (WiMAX), Orthogonal Frequency-Division Multiple Access (OFDMA), Single-carrier frequency-division multiple access (SC-FDMA), Wideband Code Division Multiple Access (W-CDMA), Time Division Synchronous Code Division Multiple Access (TD-SCDMA), IEEE 802.11, Wireless Fidelity (Wi-Fi), or some other cellular or wireless communication format, including combinations, improvements, or variations thereof.

Although one main link for each of links 140-144 is shown in FIG. 1, it should be understood that links 140-144 are merely illustrative to show communication modes or access pathways. In other examples, further links can be shown, with portions of the further wireless links shared and used for different communication sessions or different content types, among other configurations. Links 140-144 can each include many different signals sharing the same associated link, as represented by the associated line in FIG. 1, comprising resource blocks, layers, access channels, paging channels, notification channels, forward links, reverse links, user communications, communication sessions, overhead communications, carrier frequencies, other channels, timeslots, spreading codes, transportation ports, logical transportation links, network sockets, packets, or communication directions.

The included descriptions and figures depict specific embodiments to teach those skilled in the art how to make and use the best mode. For the purpose of teaching inventive principles, some conventional aspects have been simplified or omitted. Those skilled in the art will appreciate variations from these embodiments that fall within the scope of the invention. Those skilled in the art will also appreciate that the features described above can be combined in various ways to form multiple embodiments. As a result, the invention is not limited to the specific embodiments described above, but only by the claims and their equivalents.

What is claimed is:

1. A method of operating a wireless access node to provide wireless backhaul to a plurality of relay nodes associated with the wireless access node, the method comprising:

transmitting a first beamformed backhaul link to a first relay node and a second beamformed backhaul link to a second relay node by at least allocating a first quantity of resource blocks of a carrier frequency to the first beamformed backhaul link and a second quantity of the resource blocks of the carrier frequency to the second beamformed backhaul link;

monitoring traffic load information for the relay nodes while providing the wireless backhaul; and when the traffic load information exceeds a load threshold for the first relay node, then increasing a bandwidth of the first beamformed backhaul link for the first relay node by at least allocating a different amount of the resource blocks to the first beamformed backhaul link.

2. The method of claim 1, wherein allocating the different amount of the resource blocks to the first beamformed backhaul link comprises increasing the first quantity of the resource blocks allocated to the first beamformed backhaul link and decreasing the second quantity of the resource blocks allocated to the second beamformed backhaul link.

3. The method of claim 1, wherein the first beamformed backhaul link comprises a first transmission layer to form the first beamformed backhaul link at the carrier frequency and wherein the second beamformed backhaul link comprises a second transmission layer to form the second beamformed backhaul link at the carrier frequency, wherein the first transmission layer comprises a first portion of antenna elements serving a sector of wireless coverage of the wireless access node and the second transmission layer comprises a second portion of the antenna elements serving the sector of wireless coverage of the wireless access node.

4. The method of claim 3, wherein allocating the different amount of the resource blocks to the first beamformed backhaul link comprises increasing the first quantity of the resource blocks allocated to the first beamformed backhaul link over the first transmission layer.

5. The method of claim 4, wherein increasing the first quantity of the resource blocks allocated to the first beamformed backhaul link over the first transmission layer comprises allocating all of the resource blocks of the carrier frequency over the first transmission layer to the first beamformed backhaul link and none of the resource blocks of the carrier frequency over the first transmission layer to the second beamformed backhaul link.

6. The method of claim 5, further comprising:
allocating at least a portion of the resource blocks of the carrier frequency over the second transmission layer to the second beamformed backhaul link.

7. The method of claim 4, wherein increasing the first quantity of the resource blocks allocated to the first beamformed backhaul link over the first transmission layer comprises allocating all of the resource blocks of the carrier frequency over the first transmission layer and the second transmission layer to the first beamformed backhaul link during a first period of time.

8. The method of claim 7, further comprising:
allocating at least a portion of the resource blocks of the carrier frequency over the first transmission layer and the second transmission layer to the second beamformed backhaul link during a second period of time different than the first period of time.

9. The method of claim 1, wherein the first beamformed backhaul link and the second beamformed backhaul link each comprise directional wireless links configured to transmit over different angular areas of a sector of wireless coverage provided by the wireless access node.

10. The method of claim 1, wherein the resource blocks comprise physical resource blocks of a Long Term Evolution (LTE) wireless communication protocol.

11. A wireless access node configured to provide wireless backhaul to a plurality of relay nodes associated with the wireless access node, the wireless access node comprising:
a transceiver system configured to transmit a first beamformed backhaul link to a first relay node and a second beamformed backhaul link to a second relay node by at least allocating a first quantity of resource blocks of a carrier frequency to the first beamformed backhaul link and a second quantity of the resource blocks of the carrier frequency to the second beamformed backhaul link;
a control system configured to monitor traffic load information for the relay nodes while providing the wireless backhaul; and
when the traffic load information exceeds a load threshold for the first relay node, then the control system is configured to increase a bandwidth of the first beamformed backhaul link for the first relay node by at least allocating a different amount of the resource blocks to the first beamformed backhaul link.

12. The wireless access node of claim 11, comprising:
the control system configured to increase the first quantity of the resource blocks allocated to the first beamformed backhaul link and decrease the second quantity of the resource blocks allocated to the second beamformed backhaul link to allocate the different amount of the resource blocks to the first beamformed backhaul link.

13. The wireless access node of claim 11, wherein the first beamformed backhaul link comprises a first transmission layer to form the first beamformed backhaul link at the carrier frequency and wherein the second beamformed backhaul link comprises a second transmission layer to form the second beamformed backhaul link at the carrier frequency, wherein the first transmission layer comprises a first portion of antenna elements serving a sector of wireless coverage of the wireless access node and the second transmission layer comprises a second portion of the antenna elements serving the sector of wireless coverage of the wireless access node.

14. The wireless access node of claim 13, comprising:
the control system configured to increase the first quantity of the resource blocks allocated to the first beamformed backhaul link over the first transmission layer to allocate the different amount of the resource blocks to the first beamformed backhaul link.

15. The wireless access node of claim 14, comprising:
the control system configured to allocate all of the resource blocks of the carrier frequency over the first transmission layer to the first beamformed backhaul link and none of the resource blocks of the carrier frequency over the first transmission layer to the second beamformed backhaul link to increase the first quantity of the resource blocks allocated to the first beamformed backhaul link over the first transmission layer.

16. The wireless access node of claim 15, comprising:
the control system configured to allocate at least a portion of the resource blocks of the carrier frequency over the second transmission layer to the second beamformed backhaul link.

17. The wireless access node of claim 14, comprising:
the control system configured to allocate all of the resource blocks of the carrier frequency over the first transmission layer and the second transmission layer to the first beamformed backhaul link during a first period of time to increase the first quantity of the resource blocks allocated to the first beamformed backhaul link over the first transmission layer.

18. The wireless access node of claim 17, comprising:
the control system configured to allocate at least a portion of the resource blocks of the carrier frequency over the first transmission layer and the second transmission layer to the second beamformed backhaul link during a second period of time different than the first period of time.

19. The wireless access node of claim 11, wherein the first beamformed backhaul link and the second beamformed backhaul link each comprise directional wireless links configured to transmit over different angular areas of a sector of wireless coverage provided by the wireless access node.

20. The wireless access node of claim 11, wherein the resource blocks comprise physical resource blocks of a Long Term Evolution (LTE) wireless communication protocol.

* * * * *